United States Patent [19]

Dainis

[11] Patent Number: 4,973,156
[45] Date of Patent: Nov. 27, 1990

[54] LINEAR DIRECTION SENSOR CAMERAS FOR POSITION MEASUREMENT

[76] Inventor: Andrew Dainis, 2002 Ruatan St., Adelphi, Md. 20783

[21] Appl. No.: 419,280

[22] Filed: Oct. 10, 1989

[51] Int. Cl.$^5$ .............................................. G01C 1/00
[52] U.S. Cl. ...................................... 356/141; 356/1; 356/147; 356/152
[58] Field of Search ................... 356/147, 1, 141, 153, 356/460; 250/203.1, 203.2, 203.3

[56] References Cited

U.S. PATENT DOCUMENTS

| | | | |
|---|---|---|---|
| H,412 | 1/1988 | Miller, Jr. et al. | 250/203 R |
| 3,084,261 | 4/1963 | Wilson | 250/203.4 |
| 4,193,689 | 3/1980 | Reymond et al. | 356/152 |
| 4,315,690 | 2/1982 | Trocellier et al. | 356/152 |
| 4,806,747 | 2/1989 | Dunavan et al. | 356/152 X |
| 4,889,425 | 12/1989 | Edwards et al. | 356/152 |

OTHER PUBLICATIONS

D. L. Mitchelson, "Techniques for the Analysis of Human Movement", Princeton Book Company, N.J., 1976, pp. 59–64.

*Primary Examiner*—Thomas H. Tarcza
*Assistant Examiner*—Linda J. Wallace

[57] ABSTRACT

Three linear direction measurement sensors mounted adjacent to one another comprise a device for simultaneously measuring the directions of a plurality of optical targets. Four linear direction sensors distributed over at least two locations comprise a device for simultaneously measuring the three-dimensional positions of a plurality of optical targets.

8 Claims, 2 Drawing Sheets

LINEAR DIRECTION SENSOR CAMERAS FOR POSITION MEASUREMENT

BACKGROUND OF THE INVENTION

1. Field of the Invention

This invention relates to the fields of photogrammetry and stereoscopy as applied to direction and position measurements of optical targets. Images of scenes can be recorded by devices such as video cameras and digitized to yield directions of targets present in the said scenes. Data from two or more such devices whose locations and orientations are known can be combined to reconstruct the three-dimensional locations of the targets. By processing successive images recorded over time it is possible to determine the motions of the targets

2. Description of the Prior Art

Currently several technologies are available to perform direction and position measurements on optical targets by means of electronic sensors located in the image planes of measuring devices or cameras. Such devices are frequently employed to quantify motions of the human body in a variety of applications including the evaluation of patient functionality in medicine, and the enhancement of performance in athletics. Passive targets in the form of retro-reflective material or active targets in the form of light emitting diodes are attached to various body parts of interest and imaged from different locations by a number of the said devices. The application of stereoscopic principles to the target image locations measured in the image plane of each device enables the three-dimensional motions of the targets to be determined.

Devices utilizing large area tetra-lateral photo-diodes focus all light entering a lens onto a single rectangular photo-diode located in the image plane of the lens. The incident light produces currents to electrodes located at each edge of the photo-diode and the magnitudes of the currents indicate the location of the centroid of all light reaching the sensor and hence the centroid's direction relative to the device. Such devices are capable of high sampling rates but can only measure the direction of a single target at any one time. Also, these devices are subject to large measurement errors whenever light from the target is reflected or scattered by the environment and the light centroid is not the true indicator of the target's direction. Direction measurements on a plurality of targets can be accomplished by activating and measuring each target sequentially, but the technique reduces the device's effective measurement rate by a factor equal to the number of targets employed. Targets for the described device are usually constructed from light emitting diodes connected by wires to a power source controlled by a switching circuit.

Standard video systems that scan the total image focused on a Vidicon tube or a two-dimensional CCD array are routinely employed for direction measurements of optical targets. High contrast targets may be automaticaly digitized from the video signal or each frame may be totally digitized by the use of a frame grabber. Even if the total frame is not digitized the image of each target can result in considerable quantities of raw data which must be processed immediately by fast computers or stored for later processing. Additional drawbacks of standard video technology include an inadequate framing rate for many applications, and its low resolution. Non-standard video systems having higher framing rates are very expensive and provide even lower resolution and data quality. However, video technology allows the use of passive targets and is not limited to imaging a single target at one time.

Yet another target direction measuring device employs two linear direction sensors with each said sensor comprising a cylindrical convex lens system and a linear image sensor located in the image plane of the said lens system. Within each linear direction sensor the image of the target forms a line parallel to the longitudinal axis of the lens system. The longitudinal axis of the lens system will be referred to as the lens axis. The purpose of the linear image sensor is to measure the location of the target image line along a dimension orthogonal to the lens axis. A typical CCD image sensor used in such applications has high resolution, can operate at very high data rates, and comprises an elongated light sensitive area formed by a single row of discrete light sensitive elements. When used in a linear direction sensor the image sensor is mounted with the axis of its elongated light sensitive area oriented perpendiculary to the lens axis. After exposure the image sensor's light sensitive elements can be examined to determine the location of the target line and thereby establish the plane that contain both the lens axis and the target.

Two such linear image sensors having the necessary optical means may be mounted at right angles and adjacent to each other on a common plane to constitute a device for measuring the direction of a single target. If one sensor is mounted with its lens axis in a vertical orientation it determines a vertical plane containing the said lens axis and the target, and the other sensor defines another plane containing its horizontally oriented lens axis and the target. The line formed by the intersection of the two planes passes through both the device and the target and indicates the direction of the target relative to the device. The described device precludes measurement on a plurality of targets during any single exposure because N targets would result in N planes for each sensor, and these planes would intersect in N x N direction lines without providing a means to determine which intersections contain the targets. In other words, no information is available to pair the data generated by the two sensors. In order to measure a plurality of targets such systems must use multiplexed light emitting diodes with the associated inconvenience of reduced sampling rates and control wire attachments.

A related device for making three-dimensional position measurements on a single target may be constructed from three linear image sensors and the necessary optical as described by D. Mitchelson ("Techniques for the Analysis of Human Movement", Princeton Book Company, Princeton, N.J. 1976. Page 59–64) and U.S. Pat. No. 4,193,689 3/80 to Reymond and Hidalgo. This device comprises three linear direction sensors, two of the sensors having their lens axes oriented vertically and mounted at each end of a fixed bar, and a third sensor having a horizontal lens axis orientation mounted in the center of the bar. The end sensors establish two vertical planes which intersect in a vertical line containing the target and the middle sensor defines a third plane which intersects the said vertical line at the location of the target. When properly calibrated such a device yields three-dimensional position measurements of a single target. An analysis similar to that described for the two-sensor direction measurement device shows that a multiplicity of plane intersections prevents the described device from being used to carry out simultaneous measurements on a plurality of targets.

To date there has not been available a technique or device capable of making simultaneous high resolution, high sampling rate motion measurements on a plurality of optical targets.

SUMMARY OF THE INVENTION

Briefly described, the invention comprises at least three linear direction sensors, each sensor having an optical lens system with cylindrical symmetry about an axis for focusing light from optical targets onto a linear array of photosensitive elements whereby the orientation of each plane containing the axis of the lens and each target is recorded. The invention uses three or more such linear direction sensors mounted with their lens axes intersecting in a common point to simultaneously measure the directions of plurality of optical targets with sampling rates and resolutions considerably exceeding those provided by video technology. In devices incorporating just two linear direction sensors the direction of a single target is indicated by the intersection of two planes, each defined by a sensor axis and the said target. However, if a plurality of targets is imaged, more plane intersections than targets are produced and no data are available to identify the intersections containing the targets. The additional sensor defines an additional set of planes which form triple plane intersections with the planes defined by the other two sensor only along lines indicating true target directions.

In another aspect, the invention comprises an optical target position measuring device comprising at least four linear direction sensors, each said sensor having an axis and a means for generating a signal which uniquely identifies the plane containing each target and said axis, and means for mounting said at least four sensors such that at least one subset of four sensors of the said at least four sensors fulfills the conditions that the sensors are mounted at at least two locations spaced from each other, no two sensors have coincident axes, no two sensors at one location have parallel axes, and that at least two different axis orientations are demonstrated among the said subset of four sensors. The invention in this aspect provides a means to simultaneously measure the positions of a plurality of passive optical targets at the sampling rate and resolution of the linear directions sensors employed.

DESCRIPTION OF THE PREFERRED EMBODIMENTS

Figure 1:
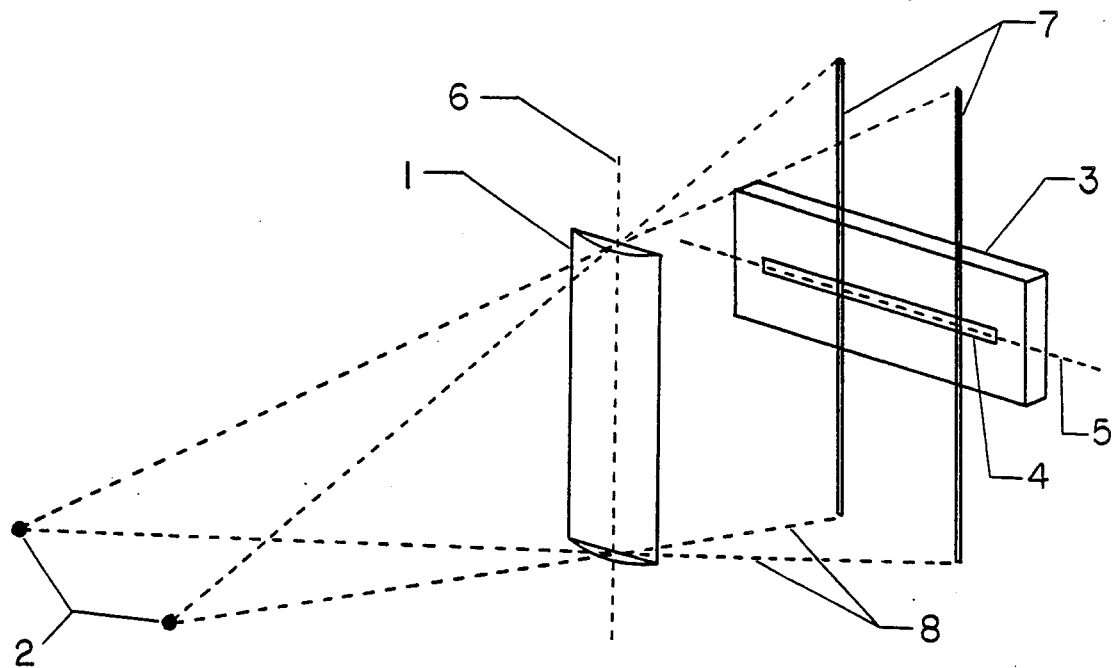
FIG. 1 is a schematic illustration of one type of linear direction sensor comprising a cylindrical lens and a linear image sensor.

A linear direction sensor is a device capable of uniquely determining a plane containing a point target and an axis embodied in the said device. FIG. 1 illustrates one embodiment of a linear direction sensor comprising a cylindrical optical lens system 1, here indicated by a simple lens, which focuses light emitted, scattered, or reflected by the targets 2, onto an image plane containing a CCD type of linear image sensor 3 having an elongated light-sensitive region 4 along an axis 5 with said axis being oriented perpendicularly to the longitudinal axis 6 of the lens 1. In the said type of linear direction sensor the lens axis 6 corresponds to the axis of the linear direction sensor. For the purposes of illustration a CCD linear image sensor using a cylindrical lens system is described, but the invention can be constructed using other types of image sensors. A CCD linear image sensor converts incident photons to charges stored in a row of discrete cells running the length of the sensitive area. At the completion of exposure the collected charges in all cells can be converted to voltage outputs and thresholded or digitized by use of circuits such as those published by image sensor manufacturers (Texas Instruments Inc., Fairchild), to determine the locations of the target image lines 7 produced by the high contrast targets 2. The lens axis 6 and the positions of the image lines on the sensor axis 5 define the planes 8 which contain the targets.

Two of the described linear direction sensors may be incorporated into a device in a manner such that they are adjacent to each other, share a common image plane and have their lens axes oriented perpendicularly with respect to each other. When this two-sensor device is used to image a single target its data define two planes, each plane containing the target and a lens axis. The two planes intersect in a line which indicates the direction of the target with respect to the device by reason that both planes contain the target and the device. However, if N targets are imaged during a single exposure then N×N plane intersections result and the two sensors provide insufficient information to allow identification of the intersections containing the targets.

Figure 2:
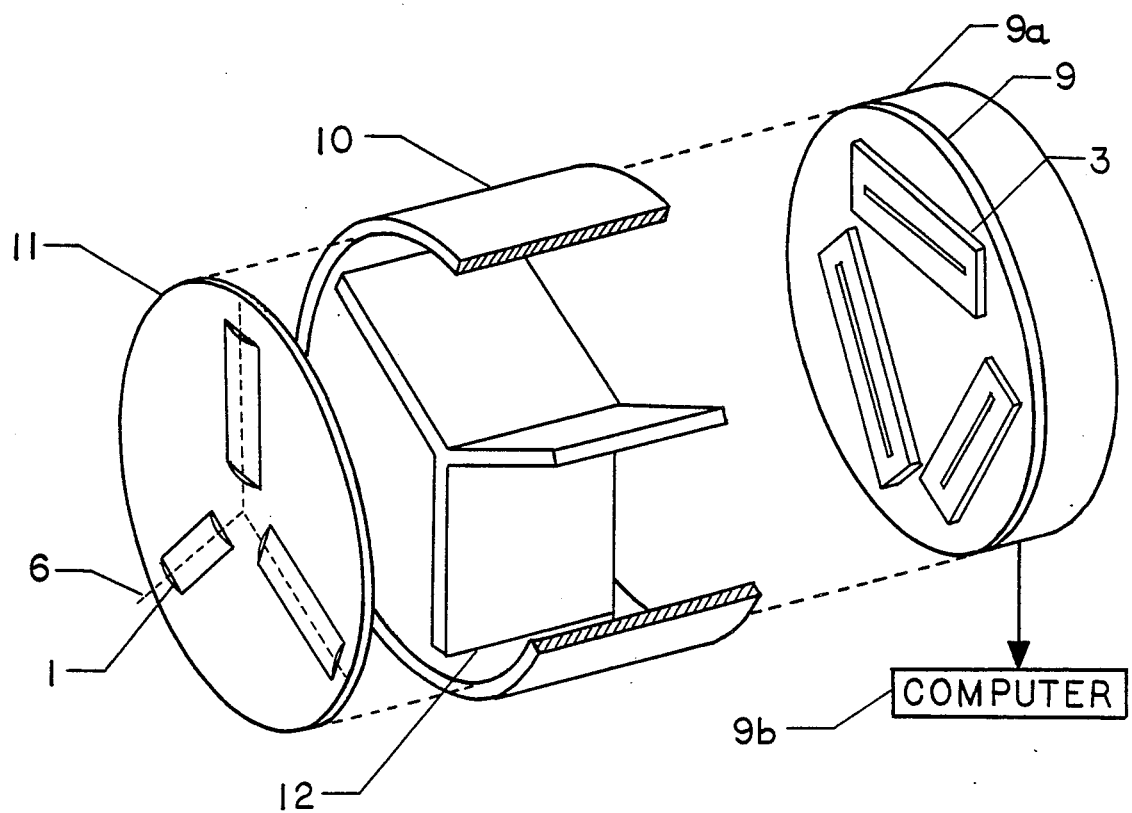
FIG. 2 is a perspective view of a triaxial linear sensor camera for performing direction measurements.

In accordance with the invention, a third linear direction sensor is introduced whose axis is not parallel with the axes of either of the other two linear direction and the axes of all three linear direction sensors intersect in a common point. One implementation of such a device, which will be called a Triaxial Linear Sensor Camera, is illustrated in FIG. 2 and uses three linear direction sensors arranged in such a manner that the axes 6 of each sensor's optical means 1 form angles of 120 degrees with respect to one and intersect in a common center, and the CCD image sensors 3 are mounted on a common supporting surface 9 which is separated by a cylinder 10 from the surface 11 holding the said optical means. A partition 12 is included between the two mounting planes 9 and 11 to ensure that each image sensor only receives light from its appropriate optics. The image sensor circuitry is located in housing 9a behind supporting surface 9, and electrical signals are conveyed to computer 9b for calculating the target directions. The form of this device is not restricted to the geometry illustrated in FIG. 2. Any device comprising at least three linear direction sensors of any construction, mounted in a manner such that their optical axes pass through one common point, will fulfill the desired function. Three linear direction sensors define three sets of planes containing the targets and the said linear direction sensors' axes, which correspond to the lens axes in the described embodiment, and the direction to each target is determined by a line which results from the mutual intersection of three planes, each plane defined by a different linear direction sensor.

Figure 3:
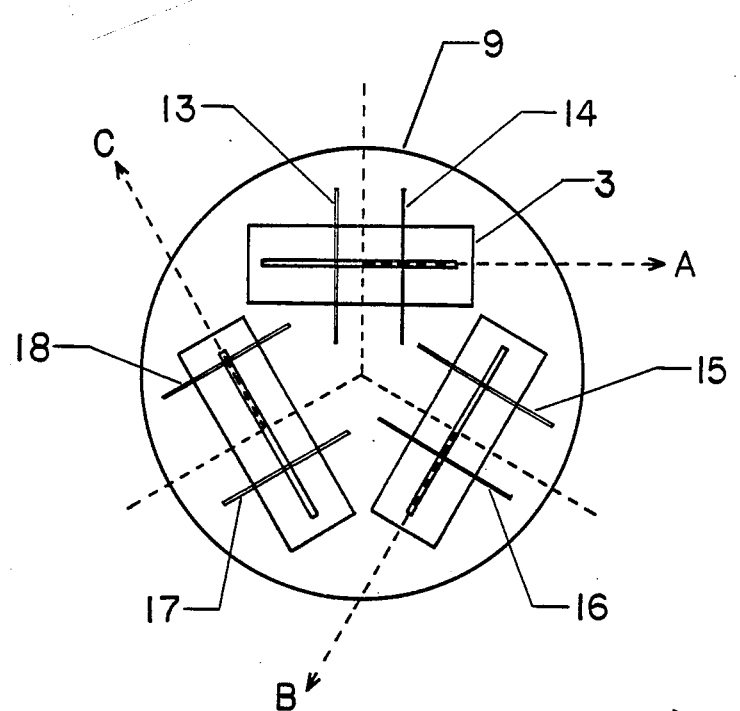
FIG. 3 illustrates the triaxial linear sensor camera coordinate system and the images formed by two targets.
Figure 4:
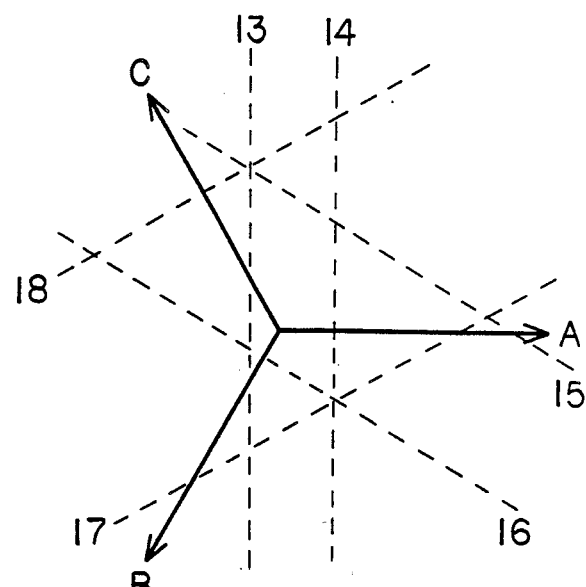
FIG. 4 graphically presents data, from two targets, in the image plane of a triaxial linear sensor camera.

In practice each sensor's data are used as illustrated in FIGS. 3 and 4. FIG. 3 illustrates the coordinate axes A, B and C for the three sensors 3 mounted on the supporting surface 9, and target image lines 13, 14, 15, 16, 17 and 18 produced by two targets. Each image sensor measures the distance from the center of the said image sensor to the position of each target image line along said sensor's coordinate axis, and generates a coordinate for each target line. If only the two sensors with coordinate axes A and B were present it would not be possible to determine from the sensor data whether line 15 or line 16 belonged to the same target that produced line 13. FIG. 4 graphically represents data, in the image plane, generated by the sensors for the two targets wherein a line perpendicular to each appropriate linear direction sensor's axis is drawn for each target at the location along the coordinate axis determined by the image sensor. Every direction with respect to the device is represented by a unique point in FIG. 4, and the specification of each point only requires two coordinates. However, a measurement of a target's direction by the device produces three coordinates, only two of which can be independent, i.e., only certain combinations of A, B, and C coordinates constitute valid target directions and they are indicated by the mutual intersections of three lines in FIG. 4. From FIG. 4 it can be readily determined that lines 13, 15 and 18 are formed by one target, and lines 14, 16 and 17 by the other target. Measurement errors, optical distortion, and the fact that the axes of the linear direction sensors may not exactly intersect in a common point will generally cause the three coordinate lines to not intersect in a common point, however, the centers of the equilateral triangles formed by the sets of three almost intersecting lines can be used as a good estimates of target directions. If necessary, the possibility of accidental line intersections being interpreted as target directions can be greatly reduced by the addition of more linear direction sensors to the device. A four sensor device would indicate target directions by the mutual intersection of four lines, etc. A practical calibration for a triaxial linear sensor camera can be perfomed by placing a single target at known locations in a plane that is perpendicular to the axis of the total device and recording the resulting A-, B-, and C-coordinates. A two-dimensional table can then be constructed having entries for A- and B-coordinates pointing to acceptable C-coordinate values.

In another aspect, the invention provides a means for simultaneously measuring the three-dimensional positions of a plurality of optical targets. An established device for measuring the position of a single target uses three linear direction sensors mounted in separate locations on an elongated structure. Typically the linear direction sensors are mounted on a common surface of a bar with one sensor mounted at each end and another mounted at its center. The end linear direction sensors are arranged with their axes oriented vertically and measure angles to the target in the horizontal plane, whereas the central linear direction sensor has its axis oriented horizontally to provide a measure of the target's elevation angle. If the system's geometry is known the outputs of the sensors may be used to directly calculate the three-dimensional position of a single target. Each end sensor defines a plane containing the target and the two planes intersect in a vertical line whose intersection with the plane defined by the central sensor determines the point location of the target. However, if there are N targets the N planes from each end sensor intersect in $N \times N$ vertical lines and the central sensor defines another N planes which intersect the vertical lines at a total of $N \times N \times N$ points. Without additional data it is not possible to choose the points which represent the target locations.

Figure 5:
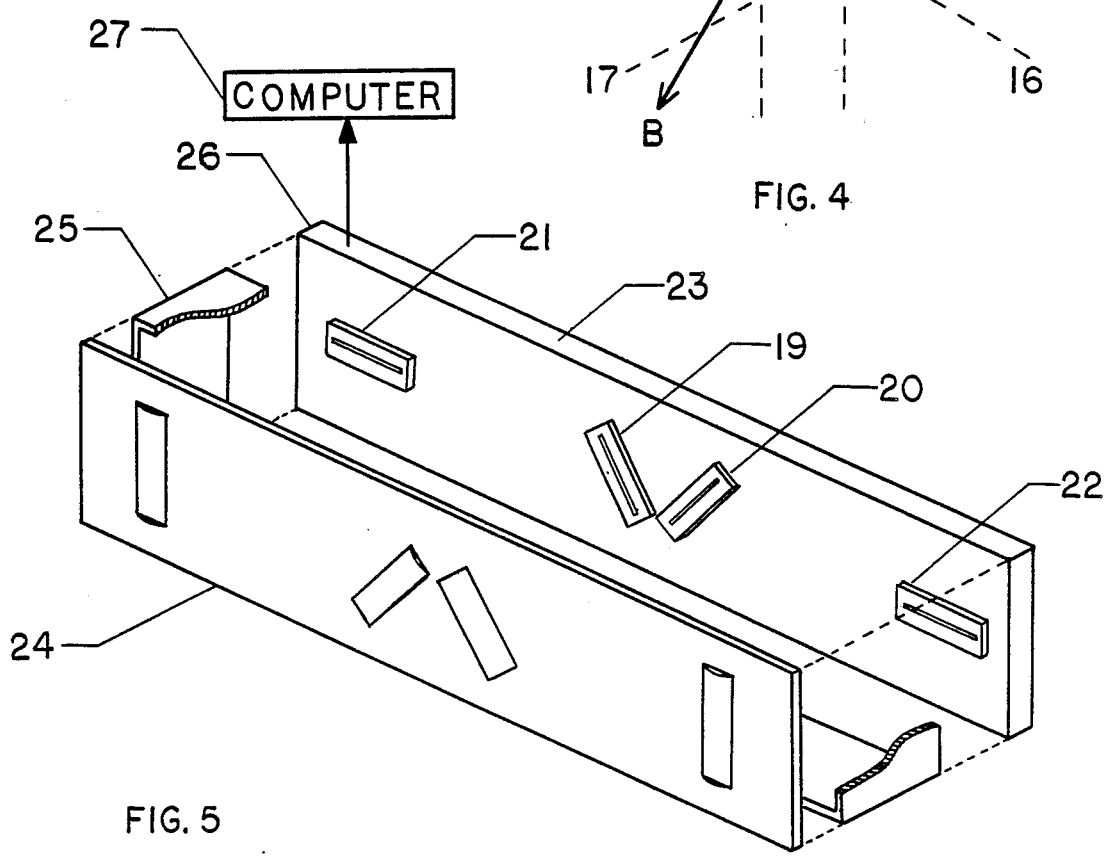
FIG. 5 is a perspective view of a three-dimensional position measurement device employing four linear direction sensors.

The incorporation of a fourth linear direction sensor allows the redundant intersection points to be eliminated. configuration of such a device using cylindrical optics and CCD linear image sensors is illustrated in FIG. 5. The image sensors 19, 20, 21 and 22 and their optical means are mounted on the two parallel elongated surfaces 23 and 24 separated by the rectangular member 25. The fourth sensor 19 is located adjacent to the central sensor 20 and they are both oriented 45 degrees with respect to the end sensors 21 and 22, and 90 degrees with respect to each. The circuitry for controlling the linear image sensors is contained in housing 26 adjacent to the mounting surface 23, and the electrical signals are routed to the computer 27 for processing. The invention in this aspect is not limited to the geometry or construction illustrated in FIG. 5. The most general requirements for this particular device are that it must comprise at least four linear direction sensors mounted in a manner such that at least one subset of four of the sensors fulfill the following conditions; be mounted at at least two different locations spaced on sufficient distance from each other to provide an adequate base for triangulation to the targets, no two sensors have coincident axes, no two sensors at any one location have parallel axes, and that at least two different axis orientations are demonstrated among the subset of four sensors. The data from the fourth sensor provides an additional $N \times N \times N$ point intersections with the $N \times N$ vertical lines containing the targets, and the targets are found where the two central sensor planes intersect a vertical line at the same point in space. Measurement and geometry errors will generally preclude the two planes from intersecting the vertical lines at exactly same locations because each target's three-dimensional position is overdetermined by one measurement. This additional data may be used to enhance the accuracy of the position measurement of each target and to indicate the reliability with which the target's location was determined. Additional linear directions sensors may be included in the device if it is necessary to increase the certainty of target location identification and position measurement accuracy.

What is claimed is:

1. A sensor system for measuring directions to a plurality of targets comprising:
   a plurality of simultaneously illuminated optical targets whose directions are to be measured,
   at least three linear direction sensors, each such sensor including:
      an optical means having an axis whereby light received from said plurality of targets is formed into a pattern containing sufficient information to describe the orientation of every plane formed by one each of the targets and said axis,
      a sensor means mounted in a manner to intercept light forming said pattern whereby features of said pattern are converted to electrical signals which describe said orientations of said planes,
   a means for mounting said at least three linear direction sensors such that said axis of any one linear direction sensor is not parallel to said axis of any other linear direction sensor, and said axes mutually intersect in a common point, and an ancillary computing means for receiving said electrical signals and calculating from said signals directions to said targets as indicated by mutual intersections of at least three planes, each plane derived from a different linear direction sensor.

2. A device according to claim 1 wherein each linear direction sensor comprises:

an optical lens system including cylindrical symmetry about a lens axis whereby light received from said plurality of targets is focused into a set of substantially parallel lines, each one of said lines lying substantially within a plane formed by said lens axis and one each of the targets;

a sensor means comprising a plurality of photosensitive elements arranged linearly along an image sensor axis wherein each one of said photosensitive elements converts light incident upon said element to a stored electrical charge;

a circuit means for converting said charges to electrical signals suitable for computer processing;

a means for supporting said lens system in a position to focus said light onto said photosensitive elements in a manner such that said lens axis forms a non-zero angle with said image sensor axis.

3. A device according to claim 1 wherein said means for mounting positions three linear direction sensors with said axes of said optical means thereof lying within a common plane, intersecting in a common point, and forming mutual angles of 120 degrees.

4. A device according to claim 3 wherein each linear direction sensor comprises:

an optical lens system including cylindrical symmetry about a lens axis whereby light received from said plurality of targets is focused into a set of substantially parallel lines, each one of said lines lying substantially within a plane formed by said lens axis and one each of the targets;

a sensor means comprising a plurality of photosensitive elements arranged linearly along an image sensor axis wherein each one of said photosensitive elements converts light incident upon said element to a stored electrical charge;

a circuit means for converting said charges to electrical signals suitable for computer processing;

a means for supporting said lens system in a position to focus said light onto said photosensitive elements in a manner such that said lens axis forms a non-zero angle with said image sensor axis.

5. A sensor system for measuring locations of a plurality of targets comprising:

a plurality of simultaneously illuminated optical targets whose positions are to be measured, a least four linear direction sensors, each such sensor including:

an optical means having an axis whereby light received from said plurality of targets is formed into a pattern containing information sufficient to quantify the orientation of every plane formed by one each of the targets and said axis, a sensor means mounted in a manner to intercept light from said pattern and convert features of said pattern to electrical signals describing said orientations of said planes, and means for mounting said at least four linear direction sensors such that at least one subset of four linear direction sensors of said at least four linear direction sensors fulfills the conditions that the sensors are mounted at at least two locations spaced from each other, no two sensors have coincident axes, no two sensors at one location have parallel axes, and that at least two different axis orientations are demonstrated among said subset of four sensors, and an ancillary means for receiving said electrical signals and computing positions of said targets as indicated by mutual intersections of at least four planes, each plane derived from a different linear direction sensor.

6. A device according to claim 5 wherein each linear direction sensor comprises:

an optical lens system including cylindrical symmetry about a lens axis whereby light received from said plurality of targets is focused into a set of substantially parallel lines, each one of said lines lying substantially within a plane formed by said lens axis and one each of the targets;

a sensor means comprising a plurality of photosensitive elements arranged linearly along an image sensor axis wherein each one of said photosensitive elements converts light incident upon said element to a stored electrical charge;

a circuit means for converting said charges to electrical signals suitable for computer processing;

a means for supporting said lens system in a position to focus said light onto said photosensitive elements in a manner such that said lens axis forms a non-zero angle with said image sensor axis.

7. A device according to claim 5 comprised of four linear direction sensors wherein said means for mounting holds the sensors at three spaced locations on a straight line with said axes of said optical means thereof contained with a common plane, and with two sensors mounted at separated locations with said axes thereof oriented perpendicularly to said line, and remaining two sensors mounted adjacent to one another at a location midway between the other two sensors and having axes thereof oriented 45 degrees from the end sensors and at 90 degrees with respect to each other.

8. A device according to claim 5 wherein each linear direction sensor comprises:

an optical lens system including cylindrical symmetry about a lens axis whereby light received from said plurality of targets is focused into a set of substantially parallel lines, each one of said lines lying substantially within a plane formed by said lens axis and one each of the targets;

a sensor means comprising a plurality of photosensitive elements arranged linearly along an image sensor axis wherein each one of said photosensitive elements converts light incident upon said element to a stored electrical charge;

a circuit means for converting said charges to electrical signals suitable for computer processing;

a means for supporting said lens system in a position to focus said light onto said photosensitive elements in a manner such that said lens axis forms a non-zero angle with said image sensor axis.

* * * * *